United States Patent
Hernando et al.

(10) Patent No.: US 7,313,953 B2
(45) Date of Patent: Jan. 1, 2008

(54) SYSTEM FOR CONTROLLING A VEHICLE WHEEL TYRE PRESSURE

(75) Inventors: Serge Hernando, Cergy (FR); Thierry Pinard, Garches (FR); Francis Delaporte, Osny (FR)

(73) Assignee: Johnson Controls Automotive Electronics, Cergy Pontoise (FR)

( * ) Notice: Subject to any disclaimer, the term of this patent is extended or adjusted under 35 U.S.C. 154(b) by 0 days.

(21) Appl. No.: 10/498,715

(22) PCT Filed: Dec. 18, 2002

(86) PCT No.: PCT/FR02/04435

§ 371 (c)(1),
(2), (4) Date: Feb. 15, 2005

(87) PCT Pub. No.: WO03/051652

PCT Pub. Date: Jun. 26, 2003

(65) Prior Publication Data

US 2005/0150284 A1    Jul. 14, 2005

(30) Foreign Application Priority Data

Dec. 18, 2001   (FR) ................................. 01 16368

(51) Int. Cl.
*B60C 23/02* (2006.01)
(52) U.S. Cl. .................................. 73/146.5
(58) Field of Classification Search ............ 73/146, 73/146.5; 340/442, 445, 447
See application file for complete search history.

(56) References Cited

U.S. PATENT DOCUMENTS

| 6,362,732 B1 * | 3/2002 | Konchin et al. ............ 340/446 |
| 6,900,725 B1 * | 5/2005 | Berry et al. ................ 340/442 |
| 6,931,923 B2 * | 8/2005 | Katou et al. ............... 73/146.5 |
| 7,053,761 B2 * | 5/2006 | Schofield et al. .......... 340/447 |
| 2003/0065430 A1 * | 4/2003 | Lu et al. ....................... 701/45 |
| 2003/0102966 A1 * | 6/2003 | Konchin et al. ............ 340/445 |
| 2006/0028326 A1 * | 2/2006 | Haas ..................... 340/426.33 |

FOREIGN PATENT DOCUMENTS

| EP | 0 997 326 A2 | 5/2000 |
| EP | 1 052 119 B1 | 11/2000 |

OTHER PUBLICATIONS

International Search Report for Application No. PCT/FR 02/04435, 2 pages.

* cited by examiner

*Primary Examiner*—Andre J. Allen
(74) *Attorney, Agent, or Firm*—Foley & Lardner LLP

(57) ABSTRACT

The system comprises a control unit (17), and, on each wheel, a pressure sensor (12) and an emitter (13) in order to transmit to the control unit (17) a pressure signal comprising data for identification of the sensor, and means (17) for determination of the speeds of rotation of the wheels, in order to associate (174,179) with each pressure signal the wheel of the corresponding sensor (12), and which comprise means (179) for comparison of data of speeds of rotation of the wheel, determined in different manners (34,50), by the periods (Ti) of the envelopes for modulation of the signals emitted by the emitters (13) and by the wheel anti-blocking device (20).

20 Claims, 3 Drawing Sheets

SYSTEM FOR CONTROLLING A VEHICLE WHEEL TYRE PRESSURE

BACKGROUND

The present invention relates to systems for checking the pressure of the tyres of the wheels of motor vehicles (TPMS, Tyre Pressure Monitoring System), with a pressure sensor on each wheel, as well as an emitter to transmit the pressure to a control unit.

In these systems, the emission signals comprise data for identification of the sensors, and, if the wheels of a vehicle were never changed, a simple initial process in the factory for learning matching of the signals and wheels would make it possible to determine the location relative to the chassis of the vehicle, of the sensors and thus of the faulty tyres. However, the wheels of a vehicle may be replaced and changed over from time to time, for example when "snow" tyres are fitted.

The applicant has therefore attempted to solve the problem of discrimination of the pressure sensors for the motor vehicle wheel tyres.

Solutions to this problem are already known.

Thus, EP 806 307 teaches association with the signal of a wheel pressure sensor, of the data relating to the speed of rotation of the wheel, determined on a dual basis, i.e. firstly from the wheel itself, and secondly from the chassis of the vehicle, which provides the positioning reference.

A solution of this type is not satisfactory, since it is very cumbersome to implement, with a plurality of devices for determination of the speed of rotation of the wheels and devices to receive the signals of the pressure sensors.

SUMMARY

The object of the present application is thus to propose an easier solution.

For this purpose, the invention proposes a system for checking the pressure of the tyres of the wheels of a motor vehicle, comprising a control unit, and, on each wheel, a pressure sensor and an emitter in order to transmit to the control unit a pressure signal comprising data for identification of the sensor, and means for determination of the speeds of rotation of the wheels, in order to associate with each pressure signal the wheel of the corresponding sensor, characterised in that the means for determination of the speeds of rotation of the wheels comprise means for comparison of the speeds of rotation of the wheel, determined in different manners.

For various reasons, the wheels of a vehicle rotate at substantially different speeds of rotation. Reference can be made for example to the differences in speeds of rotation caused by differences in pressure of the tyres, differences in wear of the treads of these same tyres, the dynamics of the vehicle, the distribution of the load, and the temperature.

The invention is distinguished in that it does not require any plurality of sensors.

According to an advantageous embodiment of the system according to the invention, the said means for determination utilize fixed wheel rotation speed sensors, the location of which is known, and preferably sensors of the wheel anti-blocking system (ABS).

The invention is thus advantageous in that it uses existing speed sensors, which is a low-cost solution. In addition, the operative method of the means for comparison assures excellent reliability of the location results, taking into account the quality of the anti-blocking sensors.

Since the applicant has realised that the modulation envelope of the signal emitted by a tyre pressure sensor is a periodic signal, with a period equal to the duration of the rotations of the wheel, the means for determination of the speeds of rotation preferably comprise means for determination of the periods of the modulation envelopes of the signals emitted by the emitters connected to the pressure sensors, and for deduction by this means of the speeds of rotation of the wheels, which permits comparisons with the speeds supplied by the localised fixed sensors, in order to localise the pressure sensors.

In another embodiment of the system according to the invention, the said means for comparison are designed to carry out comparisons only during phases of non-straight trajectories of the vehicle.

On a bend, the two wheels in a single set, i.e. front or rear, do not rotate at the same speed, and nor do the two wheels on a single side, i.e. left or right. On a bend, the speeds supplied by the fixed ABS sensors are already more distinct from one another, which is advantageous. In addition, by means of the speed of the vehicle and the dynamic characteristics of the trajectory of the vehicle, in particular the direction of turning or the angle of blocking of the wheels, it is possible to calculate the speeds of the wheels and use the speeds calculated as terms of comparison of the speeds, and thus to locate the sensors, and consequently check the pressure of the different tyres located by this means.

The speed of rotation v in revolutions per second of a wheel on the rim, of which the emitter of the sensor emits a period signal T, is given by the ratio:

$$v = 1/T \qquad (1)$$

Correlatively, the linear speed V of a tyre in contact on the ground, if c designates the circumference of this tyre, is:

$$V = c/T \qquad (2)$$

Thus, the invention is distinguished even further in that the means for determination need not comprise any wheel rotation speed sensor.

The invention will be better understood by means of the following description of several embodiments of the measuring system according to the invention, provided with reference to the attached drawings, in which:

DESCRIPTION OF EXEMPLARY EMBODIMENT

Figure 1:
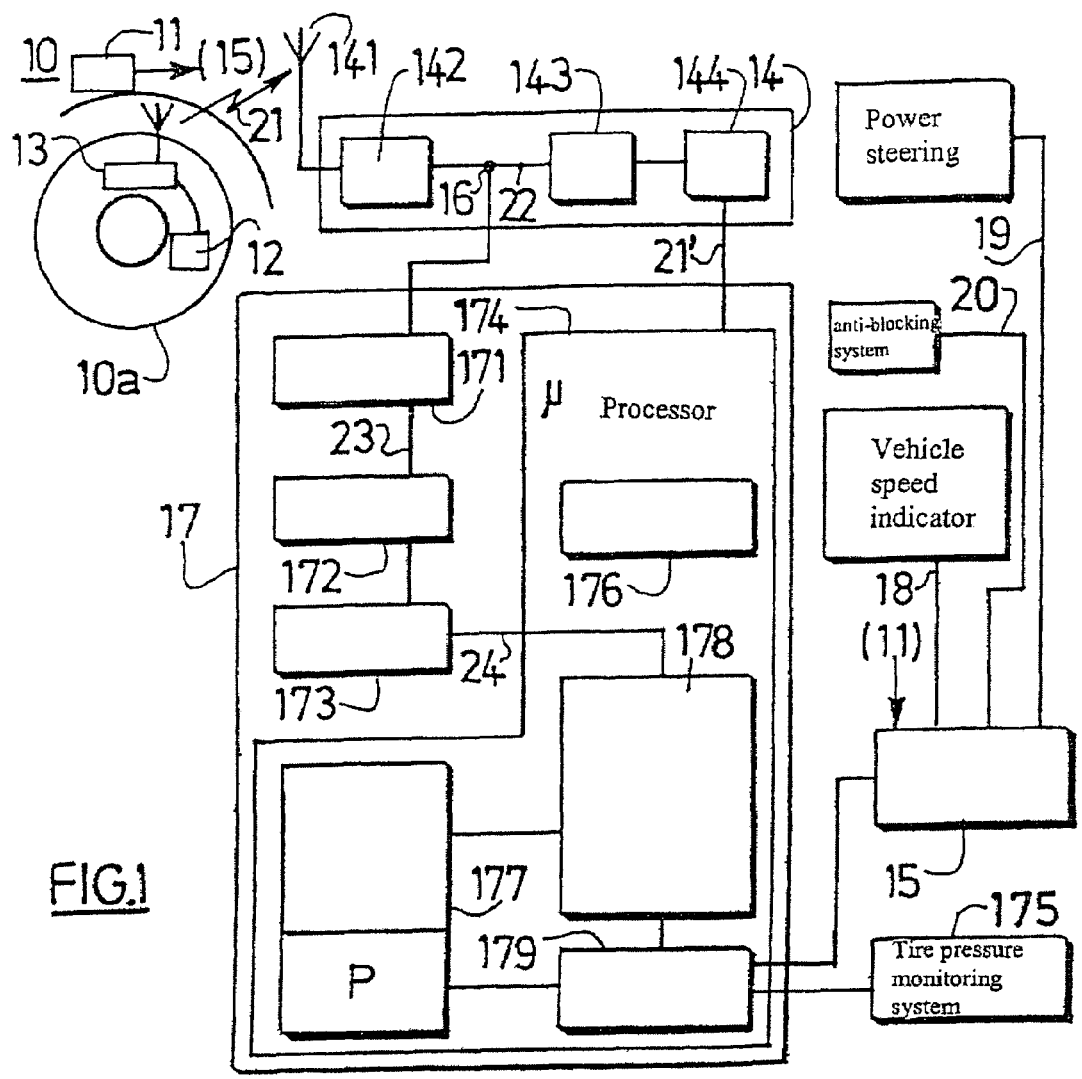
FIG. 1 represents the block diagram of the system according to the invention.

With reference to FIG. 1, for each wheel of the vehicle, the system which will now be described contains an assembly comprising a pressure sensor 12 which is connected to an emitter 13 fitted on the wheel 10a and a fixed receiver 14 which is designed to process the signal 21 emitted by the emitter 13.

The fixed receiver 14 comprises in series a receiver antenna 141, a demodulator 142 which supplies an analogue signal 22 without its carrier wave, a filter 143 and an electronic device 144 for processing of the pressure data of the tyres, which provides data 21' to a control unit 17.

The fixed receiver 14 makes it possible to transform the radio signal 21 into digital data 21' comprising the pressure of the tyre and its identification.

A shunt 16, in this case at the output of the demodulator 142, supplies the control unit 17.

The control unit 17 comprises in series a filtering circuit 171, which in this case is an RC filter which supplies a filtered signal 23, a sample and hold circuit 172 and an analogue-digital converter 173 and a microprocessor 174. The microprocessor 174 comprises programme memories 178, 179, a data memory 177 and a clock 176.

The control unit 17 emits the data for pressure, identification and location as output to a TPMS component 175 for management of this data.

In addition, the unit 17 receives as input the speed data 18 of the vehicle, through the intermediary of a data levelling circuit 15.

The programme of the memory 178 comprises at least one step 34 (FIG. 3) for calculation of the speeds of rotation of the wheels of the vehicle. The memory programme 179 comprises at least one step 50 (FIG. 3) for comparison of the wheel rotation speeds.

The control unit 17 additionally receives data 20 for the speed of rotation of the wheels and their location, obtained from the ABS sensors, again through the intermediary of the levelling circuit 15.

In this case, the control unit 17 additionally receives data 19 relating to the position of the steering wheel, for indication of turning to the left or right, or the angle of blocking of the wheels.

The functioning of the system according to the invention will now be described.

The signal 21 which is provided by the sensor 12 and emitted by its emitter 13 is subjected to parasitic modulation, caused in particular by the bodywork 10 of the vehicle, before being received by the receiver 14 and being processed there in order to give the pressure of the tyre.

By means of the shunt 16, the signal 22 is also filtered by the filter 171 of the control unit 17, which has a cut-off frequency $F_c$ slightly greater than the maximum rotation frequency of the wheels.

Figure 2:
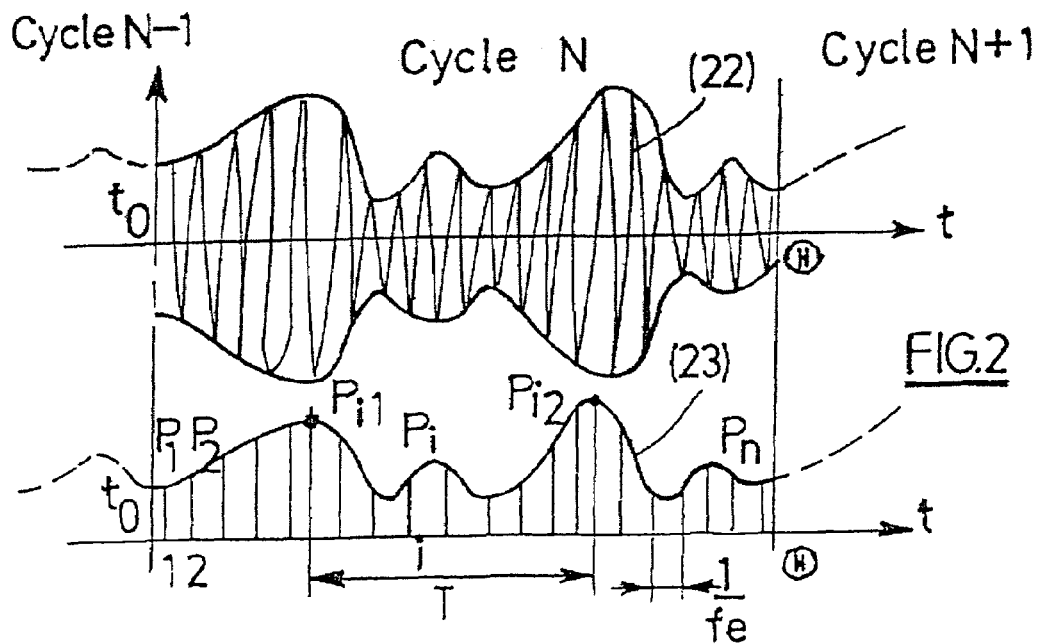
FIG. 2 represents a standard signal emitted by a pressure sensor of the system and its modulation envelope.

At the output of the filter 171, the signal 23 is sampled and digitised at a sampling frequency fe by the sample and hold circuit 172, which freezes the analogue values at regular intervals, and the analogue-digital converter 173 which supplies at its output 24 digital samples Pi of the signal, the period of which is to be determined (FIG. 2). According to Shannon's theorem, the frequency fe is at least twice the cut-off frequency $F_c$. These operations are carried out in particular by means of the clock 176, under the control of the processor 174.

Figure 3:
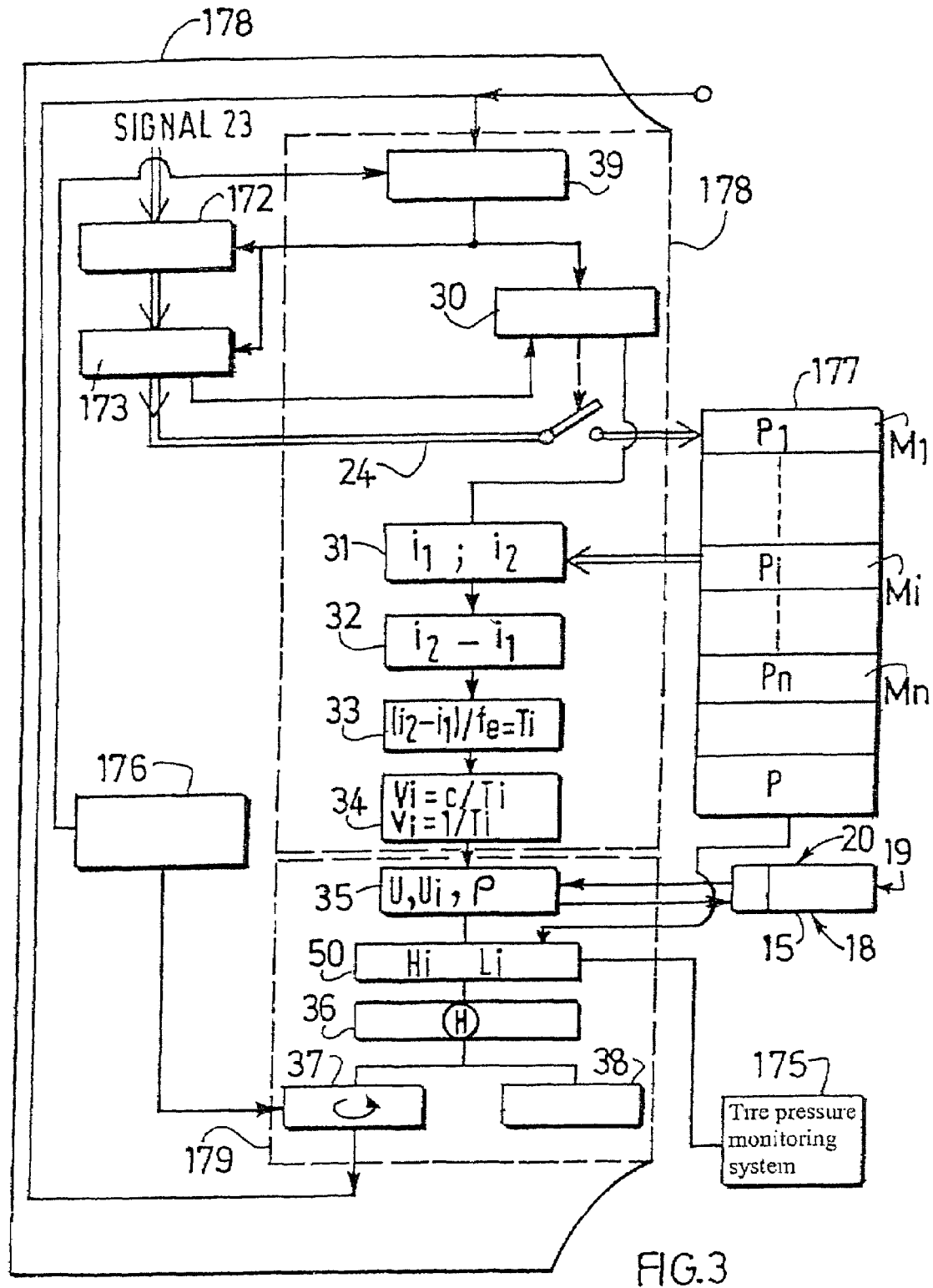
FIG. 3 represents the flow chart of the method for determination of the location of the pressure sensors of the wheels of the system.
Figure 4:
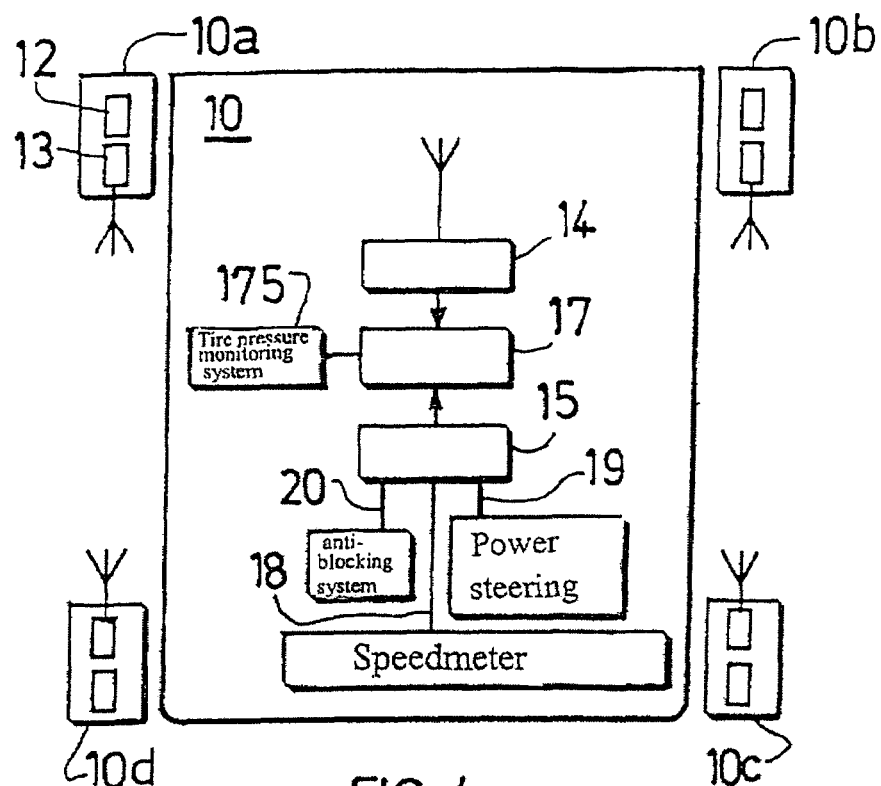
FIG. 4 illustrates the implantation of the system on a four-wheeled vehicle.

With reference to FIG. 3, the microprocessor 174 transmits the check to the memory programme 178, which acquires and stores (30) n samples Pi in the memory 177, from $P_1$ to $P_n$ respectively of the memory area $M_1$ to the memory area $M_n$. The value of n will be discussed hereinafter.

Then, the memory programme 178 calculates the speed of rotation of the wheel, which it transmits to the TPMS system 175. For this purpose, in this step, it carries out the following operations in succession for the wheel i:

search (31) for the addresses i1 and i2 for storage of the largest two values Pi in the memory 177;

calculation (32,33) of the duration which separates these two ranks, i.e. of the period of the modulation envelope Ti=(i2-i1)/fe;

calculation (34) of the rotation speed Vi=ci/Ti or angular speed vi=1/Ti

A function (39) co-ordinates the acquisitions 172,173 and the memory programme 178 by means of the clock 176.

The operations carried out by the memory programme 178 will now be described.

The data Pi is stored in the memory 177 for an observation period Θ. The observation period Θ is determined on the basis of information concerning the speed of the vehicle available from elsewhere, for example that provided by the dashboard instruments such as the speedometer or milometer.

In fact, if U is this speed in metres per second, and c is the length in metres of the circumference of the wheel, an estimation of the period T of rotation of the wheels is provided by the ratio c/U. This estimation makes it possible to select the observation period Θ in order to determine the period T of the envelopes:

$$\Theta = \frac{2c}{U} \qquad (3)$$

Starting from a certain number of calculation cycles, the observation period Θ can be optimised to a lower value, taking into account the history of the signal, knowledge of the speed of the vehicle, and the position of the maximum value during the period, up to a value which is close to T but is still higher, such that the periodic signal, the period of which is to be determined, is entirely within this period.

In order to determine the period T relating to the signal of a wheel, with reference to FIG. 2, starting from a time to and during the observation period Θ thus determined, the n sampled values obtained $P_1, P_2, \ldots, P_i, \ldots, P_n$ are placed in an order which for example is chronological 1, 2, ..., i, ... n. It will be appreciated that the number n of the values placed is such that:

$$n=fe.\Theta. \qquad (4)$$

In the signal, two successive substantially equal maximums $P_{i1}$ and $P_{i2}$ are then sought, the values of which correspond to the maximums of both of two successive periods, and their placement locations i1 and i2 are determined in this recording period Θ.

The period sought is consequently deduced:

$$T=(i2-i1)/fe \qquad (5)$$

The speed of rotation of the wheel is finally obtained between the instant to and the instant to +Θ, according to one of the above formulae (1) or (2).

It is sufficient to repeat the cycle which has just been described in order to obtain the following speeds of rotation. Sampling is then available of the instantaneous speed of rotation of the wheel with a certain sampling frequency Fe.

Since a cycle contains at least one observation period, to which in theory a processing period must be added, the period of the cycle should be a longer period, and in principle fixed.

This therefore provides a measurement of the speed of rotation of the wheels continuously at a frequency:

$$Fe=1/\Theta \qquad (6)$$

This frequency is variable, and depends on the speed of the vehicle. The higher this speed, the greater the frequency will be. Thus, the speed of rotation of the wheel Vi is obtained all the more quickly, the greater the speed of the vehicle.

It will be appreciated that there can be as many memories 177 and programme sessions active in the memory 178 during a cycle, as there are wheels.

Finally, the programme module of the memory 179 carries out comparisons of the speeds of rotation of the wheels, in order to deduce the locations of the pressure sensors of the wheels.

This programme module carries out the following operations:

acquisition (35) of the ABS speeds Uj supplied by the means 15, and transmission to the levelling means 15, of the sampling characteristics of the speeds Vi;
calculation of the location Hi (50) and verification of the conditions of validity;
making these speeds available to the TPMS system 175, or indication of conditions of validity not fulfilled;
calculation (36) of a new observation period:

$$\Theta i = \frac{2c}{U} \quad (7)$$

and of a new number of samples n to be acquired, in relation with the speed of the vehicle, c being the mean of the values ci, and $\Theta$ the greatest of the values $\Theta i$:
initialisation (38) of the following cycle, consisting of updating the period $\Theta$ and the number n previously calculated, and of erasing the memory 177;
waiting (37), if applicable, for the instant of starting of the following cycle to $+(N+1)\Theta$; and
launching of the following cycle (39) in order to check the sample and hold circuit 172 and the converter 173 and launch the memory programme 178.

These operations will now be described:

The speeds Vi are compared with the speeds of rotation of the wheels Uj supplied by the speed sensors of the wheel anti-blocking device 20, the location Lj of which is known.

The comparisons of the speeds Vi of the wheels i and Uj of the sensors j of the ABS system are carried out as follows:

There is classification, for example in the cross direction, and continuously, firstly of the speeds Vi of the wheels i, and secondly of the speeds Uj of the sensors j, and the pairs Cij of speeds (Vi, Uj) are formed, the indices i and j being such that in the classification of the speeds V, Vi has the same rank as Uj in the classification of the speeds U.

There is then association with the following conditions, of the pressure sensor of the wheel i, identified as Idi, corresponding to the speed of rotation Vi and the location Lj of the ABS speed sensor j which provided the speed Uj:
1) the difference in speeds Uj and Vi is lower than a predetermined threshold;
2) the difference between the mean of the speeds (Vi+Uj)/2 and the other speeds of the three other wheels is greater than another predetermined threshold.

It will be appreciated that these conditions are far from always being met. The speeds of rotation of the four wheels must differ sufficiently from the others, which can only be the case when the vehicle is going into a bend or after sufficiently lengthy filtering, which can be shortened considerably if the speed data acquired during the bends is excluded. The filtering operations carried out on the differences between the speeds Ui and Vj can then be highly conventional, and can be of the type known as filtering of the signal embedded in noise.

Figure 5:
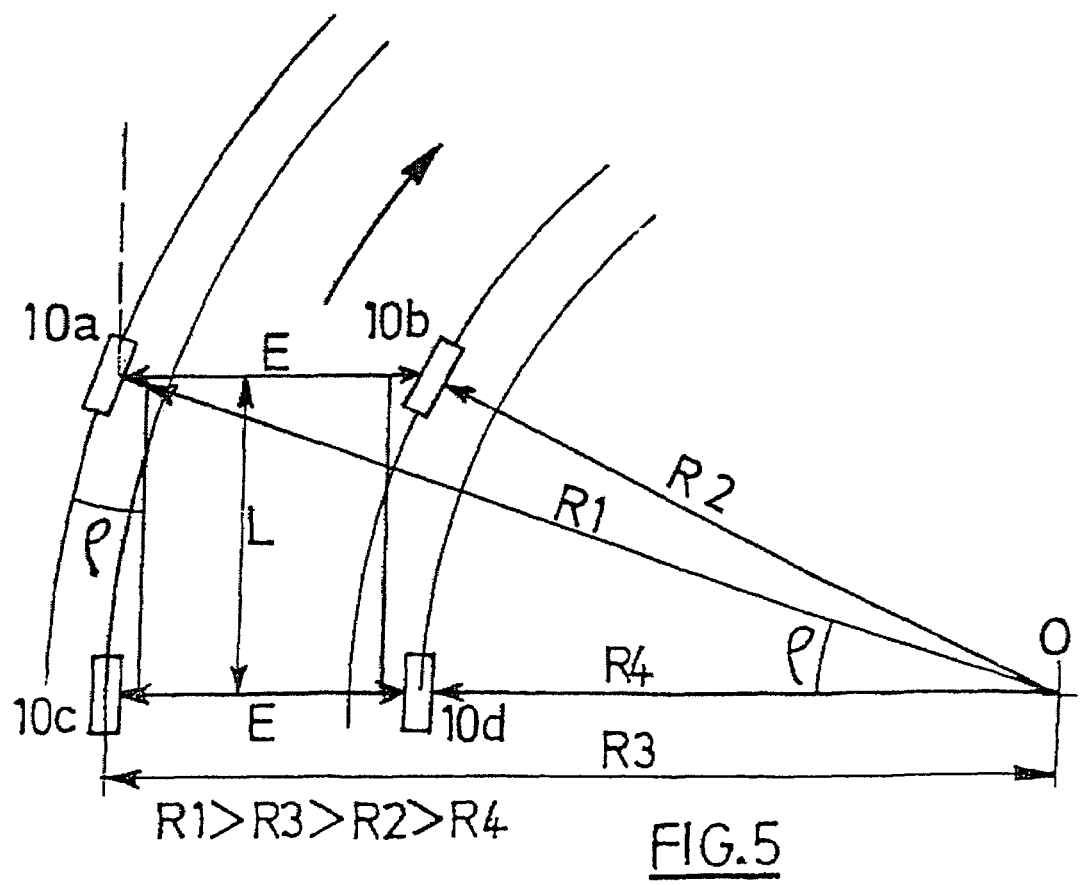
FIG. 5 illustrates the dynamic behaviour of the wheels of the vehicle on a bend.

FIG. 5 shows how these speeds can be different on bends, in this case a right-hand bend, but the results would be strictly inverted for a left-hand bend.

The vehicle, four wheels of which are indicated respectively as 10*a*, 10*b*, 10*c*, 10*d*, is going into a right-hand bend by virtue of the fact that a blocking angle ρ is being imparted to the wheels 10*a*, 10*b* of the front set. For the sake of additional simplicity let it be assumed that this angle is fixed. The vehicle, and each of its wheels, will thus travel in a circle.

The wheels 10*a*, 10*b*, 10*c*, 10*d* will thus travel in circles with respective radii R1, R2, R3, R4, which can be evaluated in a first approximation according to the wheel base E and the length L of the vehicle, as follows.

R1=L/sin ρ
R2=R1−E.cos ρ
R3=R1.cos ρ−
R4=R3−E

If a complete circle is travelled in the time dt, the speeds of rotation of the wheels are equal to:

$$Vi = \frac{2 \cdot \pi \cdot Ri}{dt} \quad (8)$$

It will be noted that in place of the ABS sensors, specific sensors 11 could be used, which are directly connected to the levelling circuit 15.

Similarly, a variant of the determination of the location of the pressure sensors is possible, by comparison of the speeds Vi with the speeds obtained on the above-described basis.

There is classification, for example in the cross-direction, and continuously, of the speeds Vi received, and the pairs are formed (Vi, Idi).

There is also available a table of classification of the locations Hj by order of the radii of blocking R, or more advantageously of the speeds V, crossing according to the characteristics of the trajectory:
bend to the left ρ>$ρ_{lim}$ (H3, H4, H1, H2)
bend to the left ρ<$ρ_{lim}$ (H3, H1, H4, H2)
bend to the right ρ>$ρ_{lim}$ (H4, H3, H2, H1)
bend to the right ρ<$ρ_{lim}$ (H4, H2, H3, H1)

$ρ_{lim}$ being the limit blocking radius for which $V_2$ and $V_3$ are substantially equal and the definitions of location Hi of the wheels i being as follows:
H1: front left wheel
H2: front right wheel
H3: rear left wheel
H4: rear right wheel There is then association of the pressure sensor of the wheel i, identified as Idi, corresponding to the speed of rotation Vi, and the corresponding location Hj, according to the following algorithm:
1) the speeds Vi and the locations Hj are of the same rank in the classifications carried out;
2) the blocking angle ρ for the period of measurement of the speed of rotation of the wheels is contained between two predetermined thresholds which are lower than $ρ_{lim}$ or higher than a third predetermined threshold greater than $ρ_{lim}$.

It will be appreciated that in this variant, it is necessary to have the value of the blocking angle. This is a value which depends on the position of the steering wheel and which can be supplied by the assisted steering system.

The following procedure can be applied with reference to the threshold values to be applied, and to the extent by which these values differ from the theoretical thresholds previously indicated in order to prevent incorrect locations, in other words with reference to the safety margins to be applied:

measurement in the vehicle manufacturing factory, of the theoretical threshold values for tyres obtained from different manufacturers, these tyres being at a nominal pressure;

measurement of the variations of these thresholds according to maximum permissible pressure variations, i.e. which do not trigger an alarm at the level of the TPMS system, of the tyres which are situated diagonally relative to the chassis of the vehicle, these pressure variations being implemented such as to decrease the difference in speeds of rotation of the corresponding wheels; and storage of the variations of these thresholds as safety margins to be applied to the theoretical thresholds in a part P of the memory 177 of the control unit 17.

In another variant embodiment, the speeds of the wheels are compared with the linear speed S of the vehicle, emitted at 18 for example by the speedometer or deduced from the milometer, in order to locate the wheels according to the direction of the bends.

Let S be the speed of the vehicle.
In the case of a bend to the left,
if $S-Vi<0$, the speed of the right-hand wheel is involved;
if $S-Vi>0$, the speed of the left-hand wheel is involved.
In the case of a bend to the right,
if $S-Vi<0$, the speed of the left-hand wheel is involved;
if $S-Vi>0$, the speed of the right-hand wheel is involved.

It will be noted that in the first embodiment, the speeds Vi and the speeds of rotation of the wheels Ui supplied by the ABS sensors are compared, after acquisition by two different means. The same applies to the variant embodiments in which comparisons of the speeds Vi are made with different speeds of the wheels in non-straight portions of trajectory, or with speeds which are based on the speed of the vehicle.

The invention claimed is:

1. A system for checking the pressure of the tires of wheels of a motor vehicle, comprising:
    a control unit,
    on each wheel, a pressure sensor and an emitter in order to transmit to the control unit a pressure signal comprising data for identification of the sensor, and
    means for determining the speeds of rotation of the wheels, in order to associate the pressure signal the wheel of the corresponding sensor,
    wherein the means for determining the speeds of rotation of the wheels comprises means for comparison of data of speeds of rotation of the wheel, determined in different manners.

2. The system of claim 1, wherein the means for determining the speeds of rotation comprise a means for determining the periods of the modulation envelopes of the signals emitted by the emitters connected to the pressure sensors, and for deduction by the means for determining the speeds of rotation of the wheels.

3. The system of claim 1, wherein the means for determining uses fixed sensors for the speed of rotation of wheels with known locations.

4. The system of claim 3, wherein the fixed sensors for the speed of rotation of the wheel are those of a wheel anti-blocking device.

5. The system of claim 1, wherein the means for comparison are designed to carry out comparisons only during phases of non-straight trajectories of the vehicle.

6. The system of claim 2, wherein means are provided which are designed to determine the speeds of the wheels on the basis of the speed of the vehicle and of the dynamic characteristics of the trajectory of the vehicle.

7. The system of claim 5, wherein means are provided which are designed to compare the speeds of the wheels with the linear speed of the vehicle in order to locate the wheels according to the direction of bends.

8. A system for checking tire pressure on a motor vehicle, comprising:
    a control unit; and
    a pressure sensor attached to at least one wheel and configured to emit a pressure signal, wherein the pressure signal comprises identification information for the sensor;
    wherein the system determines the speed of rotation of the at least one wheel, wherein the pressure signal is associated with the speed of rotation.

9. The system of claim 8, wherein the system is configured to compare a plurality of speeds of rotation, wherein at least one of the plurality of speeds of rotation is determined in a different manner than another speed in the plurality of speeds of rotation.

10. The system of claim 9, wherein one manner for determining the speed of rotation uses fixed sensors.

11. The system of claim 10, wherein the fixed sensors are attached to a anti-blocking system.

12. The system of claim 9, wherein one manner for determining the speed of rotation is based on the speed and trajectory of the vehicle.

13. The system of claim 9, wherein the system is configured to compare a linear speed of the vehicle with the speed of rotation of the at least one wheel in order to determine a wheel trajectory.

14. The system of claim 8, wherein the system is configured to determine the periods of modulation envelopes of the pressure signals and wherein the speed of rotation of the at least one wheel is deduced from the periods of modulation envelopes of the pressure signal.

15. The system of claim 8, wherein the system compares the plurality of speeds of rotation during turning of the vehicle.

16. A control circuit for a motor vehicle, comprising:
    a pressure sensor attached a wheel and configured to emit a pressure signal; and
    a circuit for determining the speed of rotation of the at least one wheel, wherein the circuit for determining the speed of rotation of the at least one wheel is configured to associate the pressure signal with the speed of rotation.

17. The control circuit of claim 16, wherein the circuit for determining the speed of rotation of the at least one wheel is configured to compare a plurality of speeds of rotation, wherein at least one of the plurality of speeds of rotation is determined in a different manner than another speed in the plurality of speeds of rotation.

18. The control circuit of claim 17, wherein one manner for determining the speed of rotation is based on the speed and trajectory of the vehicle.

19. The control circuit of claim 17, wherein the control circuit is configured to compare a linear speed of the vehicle with the speed of rotation of the at least one wheel in order to determine a wheel trajectory.

20. The control circuit of claim 8, wherein the control circuit is configured to determine the periods of modulation envelopes of the pressure signals and wherein the speed of rotation of the at least one wheel is deduced from the periods of modulation envelopes of the pressure signal.

* * * * *